United States Patent Office 3,296,156
Patented Jan. 3, 1967

3,296,156
2-AMINO-2-METHYL-PROPANOL CROSSLINKING AGENT FOR POLYURETHANE PROCESS AND PRODUCT
Russell Paul Carter, Jr., Stow, Ohio, assignor to The Goodyear Tire & Rubber Company, Akron, Ohio, a corporation of Ohio
No Drawing. Filed Oct. 1, 1962, Ser. No. 227,574
14 Claims. (Cl. 260—9)

This invention relates to a process for preparing polyurethane elastomers which are truly crosslinked but yet are relatively soft, and to the product thereof. More particularly, this invention in one of its aspects relates to the preparation of castable polyurethane reaction mixtures which are fluid and have sufficient pot life to permit castings having relatively large masses to be cast. More specifically, this invention relates to a process for preparing polyurethane compositions which are pressure moldable to yield molded objects having improved physical properties.

The patent literature is extensive in the field of cast polyurethane elastomers. Many of these patents teach that polyurethanes may be made readily with reaction mixtures containing amino alcohols as the crosslinking agent but experience has demonstrated that the amino alcohols either give relatively short pot life or the cured polyurethane elastomer has tensiles and other physical properties which are inferior to those obtained with the chlorinated diamines as crosslinking agents.

A principal object of this invention is to provide soft polyurethane elastomers that are truly crosslinked and thus obtain optimum strength properties relative to the hardness values of these elastomers. A further object of this invention is to provide a process for crosslinking a polyurethane reaction mixture with 2-amino-2-methyl propanol which has improved pot life with certain diisocyanates and which can be used to make an injection molding composition. Another object of this invention is to provide relatively soft polyurethane elastomers which are truly crosslinked and thus permit fillers to be added to raise the hardness level and thereby obtain a hard polyurethane elastomer which will be in a more favorable position to compete economically with other non-polyurethane rubber products. Other objects and advantages of this invention will be readily apparent from the description and claims.

The objects of this invention may be accomplished by reacting an excess of an organic diisocyanate with a reactive hydrogen containing polymeric material having a molecular weight of at least about 500 and then crosslinking this reaction product by reacting the excess isocyanate with 2-amino-2-methyl-propanol. Thus, it is possible to react the commercially available reactive hydrogen containing polymeric materials, such as the polyester glycols, polyether glycols, and the polyesteramides with 10% excess of the more desirable organic diisocyanates selected from the class consisting of tolylene diisocyanate (TDI), tolidine diisocyanate (TODI), and 4,4'-diphenylmethane diisocyanate (MDI), and after these two reagents have reacted, the 2-amino-2-methyl propanol is added to crosslink and cure the resulting polyurethane elastomer. Normally, the ratio of reactive hydrogen containing material to diisocyanate can vary from about 1 to 1.1 up to 3 or 4 to 1. The preferred ranges are from about 1 to 1.5 to about 1 to 2. Where the cured polyurethane is to be as an injection molding composition, then it is desirable that about 1.7 to 2.5 mols of diisocyanate be used for each mol of reactive hydrogen containing material.

Representative polyesters useful in this invention may be obtained by condensing a polybasic (preferably dibasic carboxylic) organic acid, such as adipic, sebacic, phthalic, isophthalic, terephthalic, succinic, maleic, cyclohexane-1,2-dicarboxylic, cyclohexane-1,4-dicarboxylic, naphthylene-1,2-dicarboxylic, fumaric, itaconic, etc., with polyalcohols such as ethylene glycol diethylene glycol, pentaglycol, glycerol, sorbitol, triethanolamine, di(beta-hydroxyethyl) ether, etc. and/or amino-alcohols such as ethanolamine, 3-aminopropanol, 4-aminopropanol, 5-aminopentanol-1,6-aminohexanol, 10 - aminodecanol - 6-amino-5-methylhexanol-1, p-hydroxymethylbenzylamine, etc. The preferred acids for this purpose are adipic, sebacic, and glutaric and the preferred glycols are those having from 2 to 4 carbon atoms. The polyesteramides can be made by reacting mixtures of the above polyalcohols and acids with at least one of the following amines: ethylene diamine, hexamethylene diamine, 3-methylhexamethylene diamine, decamethylene diamine, and m-phenylene diamine, etc. and/or amino-alcohols with the above dicarboxylic acids. In the esterification, the acid per se may be used for condensation or, where desirable, equivalent components, such as the acid halide or anhydride may be used. The polyester glycols and polyesteramides, preferably, should have an acid number less than about 5. The alkylene glycols and polyoxyalkylene glycols used in the practice of the invention may comprise ethylene glycol, propylene glycol, butylene glycol-2,3; butylene glycol-1,3; 2-methyl pentanediol-2,4; 2-ethylhexanediol-1,3; hexamethylene glycol, styrene glycol and decamethylene glycol, etc. and diethylene glycol, triethylene glycol, tetraethylene glycol, polyethylene ether glycols 200, 400 and 600 molecular weight, etc., dipropylene glycol, tripropylene glycol, polypropylene ether glycols, 400, 750, 1200 and 2000 etc., polytetramethylene ether glycols of varying molecular weight, usually about 700 to 3000.

Broadly, any of the prior art polyesters, polyisocyanates modified polyesters, polyesteramides, polyisocyanate modified polyesteramides, polyisocyanate modified polyesteramides, alkylene glycols, polyisocyanate modified alkylene glycols, polyoxyalkylene glycols, and polyisocyanate-modified polyoxyalkylene glycols, etc. having free reactive hydrogen atoms, free reactive carboxylic and/or especially hydroxyl groups may be employed in the process of the invention and condensed in the apparatus useful for carrying out that process but it should be borne in mind that preferred results are obtained only with the preferred reagents.

Representative examples of the organic polyisocyanates useful in the practice of this invention include hexylene-1,6 - diisocyanate, cyclohexylene - 1,2 - diisocyanate, m-phenylene diisocyanate, 2,4-tolylene diisocyanate, 2,6-tolylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, meta-xylylene diisocyanate, 1,5-naphthylene diisocyanate, and related aromatic and aliphatic polyisocyanates.

Since 2-amino-2-methyl propanol tends to absorb water rather readily in some cases, it exhibits a strong tendency to yield cured polyurethanes which contains some bubbles. The 3,3'-dimethyl-4,4'-biphenylene diisocyanate is unique in that polyurethanes prepared with it and cured with 2-amino-2-methyl propanol does not tend to form polyurethanes containing bubbles. Also, toluene diisocyanate does not exhibit this tendency where the 2-amino-2-methyl propanol is freshly distilled or has been held for some time above the boiling point of water.

This invention will be further understood by the following examples wherein all parts are by weight unless otherwise specified.

EXAMPLE 1

Ethylene adipate polyester having a reacting number of 57.3 and a carboxylic acid number less than 5 was degassed by placing the polyethylene adipate under a vacuum at 100° C. for 10 minutes; then 116 parts of the TODI was added to the reaction vessel containing 500 parts of the degassed polyethylene adipate. The polyester and diisocyanate were reacted under a vacuum at 120° C. for 30 minutes in presence of 0.1 part of triethylamine as a catalyst. Then 17 parts of 2-amino-2-methyl propanol was added and stirred into the polyester diisocyanate reaction mixture. The mixture was stirred for 2 minutes. It was still very fluid and then was poured into a tray to form a sheet 6" x 6" x 1". The tray was placed in an oven at 115° C. for 20 hours, then removed and cooled. The cooled cured stock had the following physical properties:

| | |
|---|---|
| Tensile | 6015+ |
| Elongation percent | 610+ |
| 100% Modulus | 323 |
| 300% Modulus | 568 |
| 500% Modulus | 2181 |
| Shore A | 57 |
| Crescent Tear, #/in. | 313 |
| B.S. Abrasion | 192 |
| Smear Point, ° F. | 361 |
| Compression set, percent | 67.7 |

EXAMPLE 2

A commercially available prepolymer of polytetramethylene ether glycol and toluene diisocyanate (TDI) was crosslinked with 2-amino-2-methyl propanol (freshly distilled) and then a casting was made. The polytetramethylene ether glycol and TDI were used at a volume ratio of 1:2. This polyurethane elastomer was relatively soft.

In this example one of the customary catalysts such as the triethylamine, magnesium oxide and organo tin was used.

EXAMPLE 3

Five hundred parts of an adipate ester containing 80% ethylene and 20% propylene groups was dried at 250° F. for one hour. Then .03 part of tri-ethylamine, together with 140 parts 3,3'-dimethyl-4,4'-biphenylene diisocyanate was added and allowed to react at 250° F. for one hour. To the prepolymer thus obtained 18 parts of 2-amino-2 methyl propanol was added and quickly mixed therein. Then the resulting mix was poured into a mold about ¼" deep and cured 16 hours at 220° F. This cured stock was then sent to a dicing machine and cut into pellets about ¼" on a side. These pellets were then fed to an injection molding machine and injection moldings were made at 350° F. and 10,000 pounds per square inch pressure. The molded objects then were tested for solvent resistance in perchlorethylene and it was found that the molded polyurethane objects had a greater solvent resistance to perchlorethylene than the polyurethanes obtained when ethylene glycol was used as the crosslinking or curing agent. Whereas the polyurethane injection molded objects obtained in accordance with this invention were found to be nonfibrous, those obtained when ethylene glycol was the curing agent were fibrous in nature.

EXAMPLE 4

Five hundred parts of the polyester used in Example 3 was dried for one hour at 250° F., then 75 parts of toluene diisocyanate was added and allowed to react to form a prepolymer. Eleven parts of freshly distilled 2-amino-2-methyl propanol was then incorporated into the prepolymer and poured into a flat mold and allowed to cure for 16 hours at 210°. This cured casting was essentially free of bubbles and had satisfactory physical properties.

EXAMPLE 5

In this example a mixture of polyesters was used. This mixture consisted of 450 parts of an 80% ethylene, 20% propylene adipate having the reactive number of 58 and 75 parts of ethylene adipate having a reactive number of 110. To this mixture of dry polyesters 150 parts methylene bis phenylene isocyanate was added and allowed to react to form a prepolymer. Then 9 parts 2-amino-2-methyl propanol and 25 parts of ortho dichlorobenzidene was added and quickly incorporated in the prepolymer. This liquid material containing the crosslinking agents was poured into a flat pan and cured at 200° F. for 16 hours. The cured polyurethane was then fed to a dicing machine to obtain a pelletized composition suitable for molding. These pellets were charged to an injection molding machine and tensile dumbbells were injection molded at 550° F. These tensile strips had Shore A hardness of 66 and after standing 70 hours at room temperature in perchlorethylene, the volume change was found to be 19.7% by weight. The Shore A hardness of the tensile strip at this time was 48. After the perchlorethylene-soaked tensile strip had been dried for 40 hours, the volume change was found to be 1.5% while the Shore A hardness was 63. Thus, this pelletized polyurethane composition was suitable for injection molding gaskets and other parts which need to have high solvent resistance.

Representative examples of fillers generally useful in this invention are the so-called cellulosic powder or flours obtained by grinding such materials as walnut shells, pecan shells, cashew nut shells, peanut shells, and various woods, such as pine, spruce or fir with the harder woods such as oak, walnut and elm being preferred. Of these cellulosic flours the relatively hard flours such as walnut shell is particularly preferred. The cellulosic flours have been found to produce in the cured polyurethane composition very good wearing properties or abrasion resistance, resistance to chipping, splitting, and related properties. It has been found for best results the cellulosic flours should be ground to a size of 100 mesh and preferably 200 mesh. The amount of fillers employed is not too critical. The amount used will be determined primarily by the resulting Shore A hardness desired in the compounded rubber, but usually about 10 to 100 parts per 100 parts of reactive hydrogen-containing polymeric material will be used. Normally it is considered that filler should be added to make this a desirable processing feature to raise the Shore A hardness of the resulting composition to at least about 85 Shore A.

It should be apparent that other well known fillers, such as carbon blacks, clays, silicas, etc. could be used in this invention without departing from its spirit but it should be noted that the cellulosic flours or powder are particularly preferred as they are capable of entering into reaction with diisocyanate to become an integral part of the rubber rather than as a filler per se.

According to this invention it is possible to form a reaction mixture with the organic diisocyanate and the reactive hydrogen containing polymeric material and then cure or crosslink this reaction mixture with 2-amino-2-methyl propanol to obtain a product which has a relatively low Shore A hardness relative to that obtained with the identical recipe where orthodichlorobenzidine was used as the crosslinker. Where the reaction mixture is made from the organic diisocyanates selected from the following members, TDI, TODI, and MDI, and the reactive hydrogen containing polymeric materials selected from the following members, ethylene, propylene and butylene polyester adipates or the polyether glycols, 2-amino-2-methyl propanol gives reaction mixtures which can be cured and used as an injection molding composition.

The preferred reactive hydrogen containing polymeric materials have molecular weights of 1500 to 3500 and are the polyesters formed by reacting ethylene glycol, propylene glycol, butylene glycol with adipic acid, sebacic acid and the related lower molecular weight dicarboxylic acids, i.e. those having less than about 10 carbon atoms and at least about 5 carbon atoms. Also preferred are the polyether glycols containing from 2 to about 6 carbon atoms between each polyalkyleneoxy group. The preferred polyether glycols are those where the polyoxyalkylene radical is ethylene, propylene and tetramethylene.

Normally an excess of organic diisocyanate is required to obtain a crosslinked polyurethane elastomer. Applicants have found that where the diisocyanate to polyester ratio is on a molar basis about 2:1 or slightly higher, the resulting elastomer is sufficiently crosslinked to obtain good strength properties and also to permit castings to be made without resorting to special casting techniques. Thus the preferred molar ratio value for making a polyurethane elastomer of this invention is about 1.25 to no greater than about 3. The preferred diisocyanates for use in this invention are TODI and TDI as these require less precautions to produce bubble free cured products.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane elastomer comprising the reaction product of 1.1 to about 4 mols of an organic diisocyanate with one mol of a reactive hydrogen containing polymeric material having a molecular weight of at least 500 and selected from the class consisting of polyester glycols, polyether glycols and the polyester amides and then crosslinking with a 2-amino-2-methyl propanol.

2. The product of claim 1 wherein the organic diisocyanate is selected from the class consisting of 4,4'-diphenylmethane diisocyanate, tolylene diisocyanate and tolidine diisocyanate.

3. The products of claim 1 wherein the organic diisocyanate is tolidine diisocyanate.

4. The process for making polyurethane elastomers having a Shore A hardness less than about 75 comprising (1) forming a fluid reaction mixture which comprises (a) a reactive hydrogen containing polymeric material having a molecular weight of at least 500 and a hydroxyl number greater than the acid number, (b) at least a 10% excess of organic diisocyanate over the amount equivalent to the reactive hydrogen in said polymeric materials and (c) 2-amino-2-methyl propanol, and (2) then casting said fluid reaction mixture into a shaping means for reacting said mixture to form a solid cured elastomer.

5. The process of claim 4 wherein the organic diisocyanates are selected from the class consisting of 4,4'-diphenylmethane diisocyanate, tolylene diisocyanate and tolidine diisocyanate.

6. A process for making polyurethane which is truly crosslinked but still relatively soft comprising reacting a molar excess of an organic diisocyanate with a reactive-hydrogen containing polymeric material of at least about 500 molecular weight and then crosslinking by reacting the excess polyisocyanate with 2-amino-2-methyl propanol, said diisocyanate being selected from the class consisting of 4,4'-diphenylmethane diisocyanate, tolylene diisocyanate and tolidine diisocyanate.

7. The process of claim 6 wherein the diisocyanate is tolidine diisocyanate.

8. The process of claim 6 wherein the diisocyanate is tolylene diisocyanate.

9. The process of claim 6 wherein the reactive hydrogen containing polymeric material and the diisocyanate are reacted in the presence of a cellulosic filler.

10. The process of claim 9 wherein the cellulosic filler is selected from the class consisting of nut shell flours and the hard wood flours.

11. The process of claim 9 wherein the amount of cellulosic filler present is from 10 to 100 parts per hundred parts of hydrogen-containing polymeric material.

12. A method of preparing a polyurethane injection molding composition comprising (1) forming a reaction mixture which comprises a reactive hydrogen containing polymeric material having a molecular weight of at least 500 and at least a 10% excess of organic diisocyanate of the amount equivalent to the reactive hydrogen in said polymeric material; (2) reacting said diisocyanate and said polymeric material to form a prepolymer; (3) setting and curing the prepolymer with 2-amino-2-methyl propane, and (4) then treating the cured composition to obtain a particulated one.

13. The process of claim 4 wherein the 2-amino-2-methyl propanol has been held at a temperature above the boiling point of water for some time prior to being added to the reaction mixture.

14. The process of claim 12 wherein the 2-amino-2-methyl propanol has been held at a temperature above the boiling point of water for some time prior to being added to the reaction mixture.

References Cited by the Examiner

UNITED STATES PATENTS

| | | | |
|---|---|---|---|
| 2,620,516 | 12/1952 | Muller | 260—77.5 |
| 2,621,166 | 12/1952 | Schmidt et al. | 260—75 |
| 2,983,702 | 5/1961 | Little et al. | 260—9 |
| 3,022,257 | 2/1962 | Gates et al. | 260—9 |
| 3,133,340 | 5/1964 | Finelli | 260—75 |

FOREIGN PATENTS

| | | |
|---|---|---|
| 1,231,178 | 4/1960 | France. |
| 1,071,949 | 12/1959 | Germany. |

WILLIAM H. SHORT, *Primary Examiner.*

JAMES A. SEIDLECK, J. J. NORRIS,
E. M. WOODBERRY, *Assistant Examiners.*